United States Patent Office 3,408,925
Patented Nov. 5, 1968

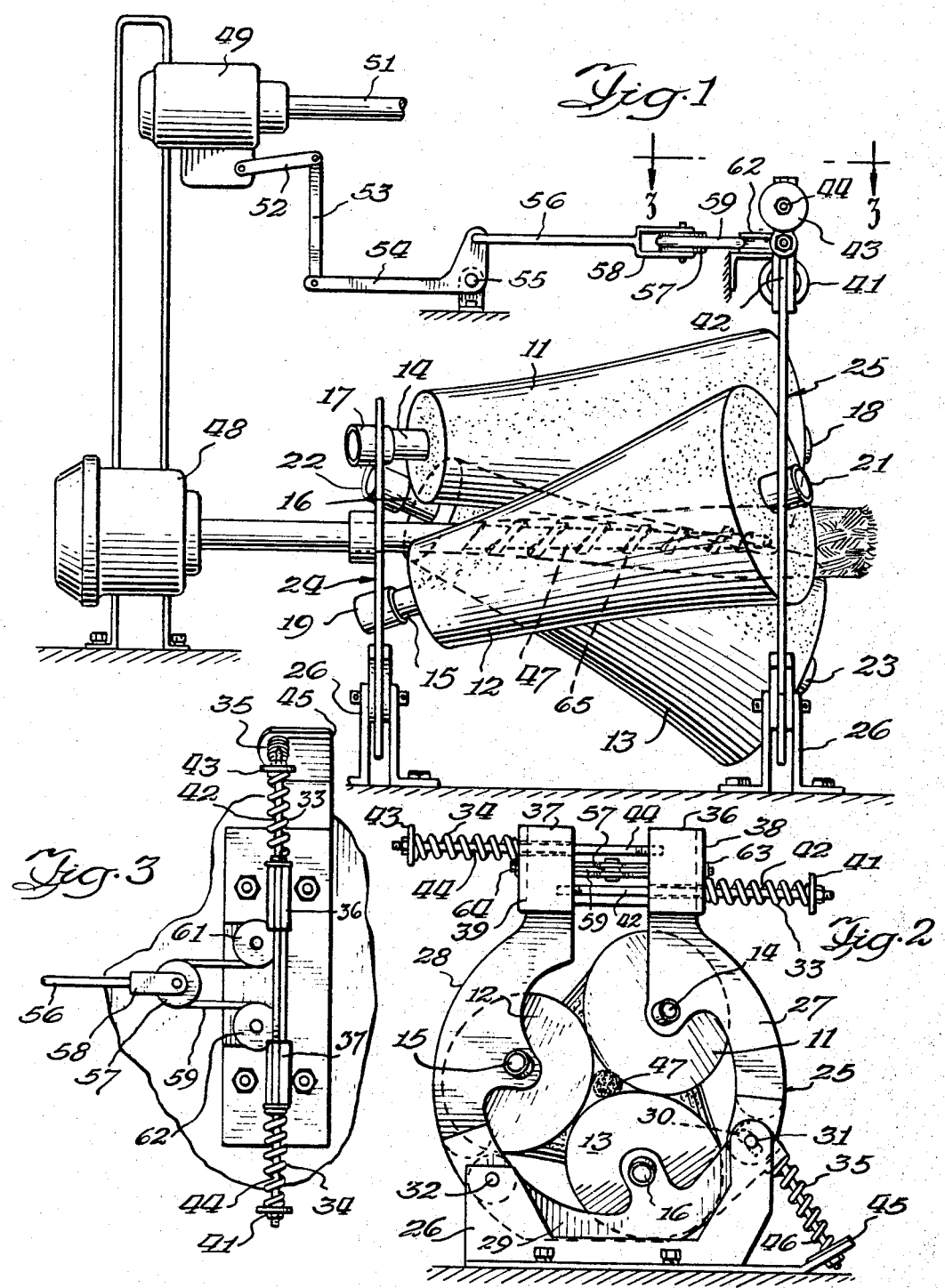

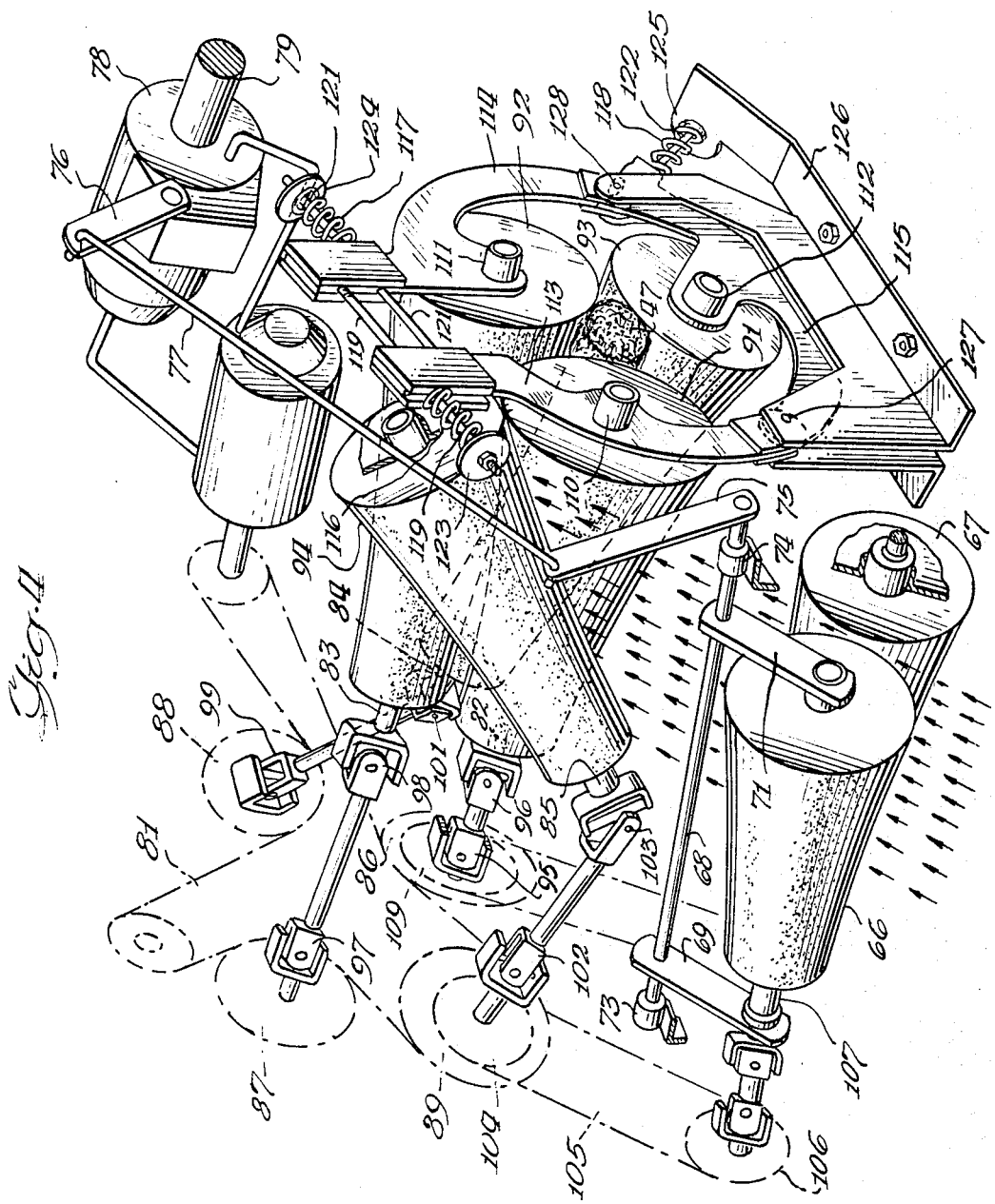

3,408,925
APPARATUS FOR FORMING FEED CROP
MATERIAL INTO ROLLS OF UNIFORM
DENSITY
Richard W. Bushmeyer, Rockford, Ill., assignor to J. I.
Case Company, a corporation of Wisconsin
Filed May 9, 1967, Ser. No. 637,280
10 Claims. (Cl. 100—45)

ABSTRACT OF THE DISCLOSURE

Feed crop material is fed into the apparatus as the apparatus is driven or pulled across a field, and is formed into an elongated roll of substantially uniform density that is moved axially from the apparatus. The apparatus has speed control means to vary the rate of the axial movement of the roll, and load sensing means to regulate the speed control means. As the apparatus is moved across the field at a uniform speed, the amount of feed crop material fed to it varies as the yield of the crop varies in different portions of the field. In areas of reduced yield, the rate of axial movement of the roll is reduced proportionally, and in areas of increased yield, the rate is increased, and thus the density of the roll, and of the pellets into which the roll is cut, is maintained substantially uniform.

---

The general structure of a pelleting machine in which the structural features of the present invention may be incorporated is disclosed in the Bushmeyer et al. application Ser. No. 504,972, filed Oct. 24, 1965, and assigned to the assignee of the present application.

In the prior art, as exemplified by the above mentioned application, the wrapping rollers have been resiliently mounted to accommodate variations in the rate of feeding the crop material into the machine.

The present invention relates to roll forming apparatus for use with a pelleting device of the type described in the above mentioned application, and is particularly concerned with means for maintaining the density of the roll substantially uniform. In the illustrated embodiment, as the feed crop material, such as hay, for example, is picked up from a windrow, or the like, it is wrapped into a roll in a wrapping chamber formed by three wrapping rollers. The wrapping rollers are mounted in skewed relationship to impart an axial movement to the roll of feed crop material so as to eject it from the machine. The skewed relationship of the wrapping rollers is fixed, and the rate of the axial movement of the roll is regulated either by varying the rotational speed of the wrapping rollers or by varying the rotational speed of a spindle mounted so as to extend axially through the wrapping chamber.

The rotational speed of the wrapping rollers, or of the spindle, is varied by speed control means that are regulated by load sensing means. The load sensing means may be actuated by relative movement of the wrapping rollers, or by relative movement of a pair of crushing rollers that may be mounted forwardly of the wrapping rollers.

Structure by means of which the above mentioned and other advantages of the invention are attained will be fully described in the following specification, taken in conjunction with the accompanying drawings showing a few preferred illustrative embodiments of the invention, in which:

FIGURE 1 is a perspective view of the apparatus embodying the invention;

FIGURE 2 is an end elevational view, showing individually pivoted brackets for supporting the ends of the wrapping rollers;

FIGURE 3 is a fragmentary plan view, taken along the line 3—3 of FIGURE 1; and

FIGURE 4 is a perspective view of another embodiment of the roll forming apparatus.

Referring to the drawings, the roll forming apparatus will be described without specific reference to the structure that enables it to be moved through a field from which the feed crop material is to be removed, the finishing rollers that continue the compacting and the axial movement of the elongated roll at least until it is cut into pellets, or the cutting mechanism for cutting the elongated roll of crop material into pellets. The above mentioned features are not shown in this application because they are described in the above mentioned patent application and do not comprise part of the present invention.

In accordance with the present invention, the apparatus is secured to the bed of a vehicle adapted to be pulled or driven across a field containing crops previously harvested by any suitable cutting mechanism. The crop material is fed, in any suitable manner, into a wrapping chamber formed between three continuously rotated, especially shaped wrapping rollers 11, 12, and 13, which in the drawings are in the form of hyperboloids. The rollers are mounted in skewed relationship to move the roll of feed crop material axially of the rollers.

The rollers 11, 12 and 13 have shafts 14, 15 and 16 that are journaled in bearings 17 and 18, 19 and 21, and 22 and 23, respectively. The bearings 17, 19 and 22 are mounted in a bracket structure 24, and the bearings 18, 21 and 23 are mounted in a bracket structure 25. The bracket structures are alike, except that the structure 25 is operatively connected to the load sensing means, as hereinafter described, and the structure 24 is free of such connection. The bracket structure comprises a base support member 26 rigidly secured to the bed of the vehicle carrying the apparatus, and three brackets 27, 28, and 29, each having one of the bearings mounted therein. The bracket 27 is pivoted to one end of the base support member 26, as indicated at 31, and the brackets 28 and 29 are pivoted to the opposite end of the base support member, as indicated at 32. The bracket 29 has an elongated slot 30 through which the pivot pin 31 extends. The slot permits the bracket 29 to move about its pivot 32. The pivotal mounting of the brackets allows rollers 11, 12, and 13 to move outwardly from the axis of the wrapping chamber whenever the rate of feeding the crop material into the wrapping chamber increases to where there is an outward force exerted on the rollers.

The outward movement of the brackets 27, 28 and 29 is opposed by compression springs 33, 34 and 35, respectively, which urge the brackets back toward their initial positions whenever the rate of feeding the crop material into the wrapping chamber is reduced. The bracket 27 is provided with an upstanding arm 36 at its end remote from the pivot 31, and the bracket 28 is provided with an upstanding arm 37 parallel to the arm 36. Plates 38 and 39, respectively, are held against the outer surfaces of the arms 36 and 37 by the springs 33 and 34 for reasons hereinafter disclosed. The spring 33 is biased between the plate 38 and a washer 41 mounted on one end of a rod 42. The rod 42 extends through openings in the plate 38 and the arm 36, and is screwed into a threaded opening in the arm 37, or is secured to the arm 37 in any other suitable manner. The spring 34 encircles a rod 44 and is biased between the plate 39 and a washer 43 secured adjacent the outer end of the rod 44. The rod 44 extends through openings in the plate 39 and the arm 37, and is screwed into a threaded opening in the arm 36. When the arms 36 and 37 are forced apart by outward movement of the rollers 11 and 12, the arm 37 pulls the rod 42 to the left, as viewed in FIGURE 2, and compresses the spring 33. The arm 36 similarly pulls the rod 44 to the right, as viewed in FIGURE 2. The relative movement between the arms 36 and 37 moves a cord or cable comprising part of a speed control mechanism hereinafter described. When the force pushing the rollers 11 and 12 outwardly is released, the springs 33 and 34 push the arms 36 and 37 toward each other. The spring 35 is mounted on a rod 46 and is biased between the bracket 29 and a plate 45 extending outwardly from the base support member 26. The spring 35 permits the roller 13 to be moved outwardly, so that the roll of feed crop material remains centered relative to the rollers 11, 12 and 13.

The springs 33, 34 and 35 cooperate to move the brackets 27, 28, and 29 toward their initial positions upon any reduction in the rate at which the feed crop material is fed into the wrapping chamber. The springs may be adjusted to provide any desired tension on the wrapping rollers.

The elongated roll of crop material formed in the wrapping chamber is moved axially of the rollers so that it can be cut into pellets and discharged. The rate of the axial movement of the elongated roll is varied by changing the rotational speed of a spindle 47 relative to the rotational speed of the rollers 11, 12 and 13.

The spindle 47 extends axially through the wrapping chamber and is constantly rotated by a hydraulic motor 48. The speed of the motor 48 is controlled by a hydraulic pump 49 operated by a power shaft 51. Other suitable drive units, such as, for example, variable V-belt, electrical, or frictional, may be substituted for the hydrostatic drive unit shown, if desired. The pump, and the hydraulic motor, are regulated by a linkage comprising spring loaded speed control arm 52 connected by a link 53 to one end of a bell crank 54 having a fixed pivot 55. A link 56, connected to the other end of the bell crank, has a sheave 57 rotatably mounted in a clevis 58 at its other end. A cable 59 extending around the sheave 57 has its ends extending outwardly around pulley wheels 61 and 62. One end of the cable 59 extends through an aperture in the plate 38, and the other end extends through an aperture in the plate 39. The ends of the cable are kept from being pulled out of the apertures in the plates 38 and 39 by stop members 63 and 64, respectively.

When the brackets 27 and 28 are moved outwardly, by increases in the rate at which the feed crop material is fed into the wrapping chamber, the plates 38 and 39 force the stop members 63 and 64 outwardly, thus pulling the link 56 to the right, as viewed in FIGURE 3. The pivotal movement of the bell crank clockwise about the pivot 55 lifts the arm 52 to speed the motor 48, and movement in the opposite direction slows it. The spring loading of the arm 52 (not shown) urges it toward its initial position whenever the rate of feeding the crop material into the wrapping chamber is reduced.

The spindle 47 is provided with an external helical thread 65 to provide a more positive engagement with the feed crop that enters the wrapping chamber. The feed crop material is wrapped uniformly into an elongated roll, and is moved axially of the wrapping chamber at a rate proportional to the rate at which it is fed into the wrapping chamber. In this embodiment of the invention, the wrapping rollers are driven at a uniform speed, independently of the speed of the spindle, to compress the feed crop material into the form of an elongated roll as it is moved axially of the wrapping chamber by the spindle, and the rotational speed of the spindle is varied to regulate the rate of axial movement of the elongated roll. When the wrapping rollers are moved outwardly by an increase in the feeding rate, the load sensing means actuates the speed control means to increase the rotational speed of the spindle, and thereby increases the rate of axial movement of the elongated roll. When the feeding rate decreases, the wrapping rollers move inwardly, and reverse the procedure to show the axial movement of the elongated core. In this way, the density of the elongated roll is kept uniform regardless of the rate at which the feed crop material enters the wrapping chamber.

In the embodiment of the invention disclosed in FIGURE 4, the axial movement of the elongated roll is controlled by the rotational speed of the wrapping rollers, rather than by the spindle. If a spindle is used, it is used merely as a mandrel upon which the elongated roll of feed crop material is wrapped, and has no effect upon the rate of axial movement of the roll. Although the load sensing means may be actuated by the relative outward movement of the wrapping rollers in the embodiment of FIGURE 4, it is preferred to actuate it by a different part of the apparatus.

In the embodiment of the invention described in connection with FIGURES 1-3, the load sensing means is actuated by the relative outward movement of the wrapping rollers. However, it may be actuated by other parts of the apparatus. For example, in the embodiment disclosed in FIGURE 4, the load sensing means is actuated by relative movement between two crushing rollers 66 and 67 mounted forwardly of the wrapping chamber in such a manner that the feed crop material passes between them before it enters the wrapping chamber. Any change in the rate at which the feed crop material passes between the crushing rollers causes relative movement between them, and a torsion bar 68 that is connected to one end of a linkage, hereinafter described, is moved to vary the speed of the drive means for rotating the wrapping rollers.

The axis of the crushing roller 67 is fixed, and the axis of the crushing roller 66 is movable. The roller 66 moves outwardly, relative to the roller 67, in response to an increase in the rate at which the feed crop material passes between the rollers 66 and 67. Two arms 69 and 71 are fixed to the shaft 72 of the roller 66 adjacent opposite ends of the roller, and the other end of each arm is fixed to the torsion bar 68 that is journaled in fixed bearings 73 and 74. A link 75, fixed at one end to the torsion bar, is connected to a speed control arm 76 by a rod 77. The speed control arm is connected to a variable hydraulic speed transmission 78 operated by a power shaft 79. The transmission 78 furnishes the motive power to drive a chain 81.

An increase in the rate at which the feed crop material passes between the crushing rollers causes the roller 66 to move outwardly from the roller 67, and thus rotates the torsion bar 68 in one direction to increase the speed of the drive of which the chain 81 is a part. The chain 81 drives four shafts 82, 83, 84 and 85 through sprockets 86, 87, 88 and 89, respectively. The shafts 82, 83 and 84 are connected to wrapping rollers 91, 92 and 93, respectively, and, since the sprockets 86, 87 and 88 are of equal diameter, drive the wrapping rollers at the same speed.

The wrapping rollers are each of hyperbolic shape, and are arranged in skewed relationship to form a wrapping chamber between them. The skewed relationship between the wrapping rollers causes the elongated roll of feed crop material formed in the wrapping chamber to move axially toward the discharge end of the wrapping chamber as it is formed. The angular relationship of the wrapping rollers determines the speed of the axial movement of the elongated roll when the rotational speed of the wrapping rollers is constant. Accordingly, the angularity of the wrapping rollers is adjusted to provide a specific rate of axial movement of the elongated roll at a predetermined rotational speed of the wrapping rollers. The density of the elongated roll of feed crop material remains uniform as long as the rate at which the feed crop material passes between the crushing rollers remains unchanged.

If the feed rate increases, the crushing roller 66 is moved away from the roller 67 by the increased amount of feed crop material. The resultant movement of the linkage operates the speed control arm 76 to increase the rotational speed of the wrapping rollers 91, 92 and 93. The increased rotational speed of the wrapping rollers causes the elongated roll of feed crop material to be moved out of the wrapping chamber as soon as its density reaches the desired standard.

When the feed rate decreases, the crushing roller 66 moves toward the roller 67 and the speed control arm 76 is moved in the opposite direction. The rotational speed of the wrapping rollers 91, 92 and 93 is decreased to allow the elongated roll of feed crop material to remain in the wrapping chamber for a longer period of time. The rotational speed of the wrapping rollers is so adjusted that the axial movement of the elongated roll of feed crop material causes it to be moved out of the wrapping chamber when the roll reaches the desired density.

The shafts upon which the wrapping rollers are mounted are each provided with means for adjusting the angular relationship of the rollers. The shaft 82 has a pair of couplings 95 and 96 between its sprocket 86 and the wrapping roller 91 to permit angular adjustment of the roller 91 relative to the wrapping chamber. The shaft 83 has a pair of couplings 97 and 98 between its sprocket 87 and the wrapping roller 92, and the shaft 84 has a pair of couplings 99 and 101 betwen its sprocket 88 and the wrapping roller 93, to permit angular adjustment of the wrapping rollers 92 and 93. The angular relationship between the wrapping rollers is not changed after the initial adjustment, because thereafter the speed of the axial movement of the elongated roll is changed by variations in the rate at which the feed crop material passes between the crushing rollers, as described above, to maintain uniformity in the density of the elongated roll.

The feed crop material is directed from the crushing rollers into the wrapping chamber by a charging roller 94 that is driven by the shaft 85. The shaft 85 is provided with a pair of couplings 102 and 103 that permit angular adjustment of the charging roller. The shaft 85 has a sprocket 104 mounted thereon to drive a chain 105 that engages a sprocket 106 on a shaft 107 to rotate the crushing roller 66. The crushing roller 67 is similarly rotated through a chain 108 driven by a sprocket 109 fixed to the shaft 82.

The wrapping rollers 91, 92, and 93 are protected by resilient mountings against damage that might otherwise be caused by sudden fluctuations in the rate at which the feed crop material enters the wrapping chamber. The ends of the rollers 91, 92, and 93 remote from the driving mechanism are journaled in bearings 110, 111, and 112 that are mounted in individually pivoted brackets 113, 114, and 115, respectively. The brackets are resiliently mounted and are provided with springs 116, 117, and 118 that are mounted on rods 119, 121, and 122, respectively. The spring 116 is biased between the upper end of the bracket 113 and a washer 123 secured to the outer end of the red 119. The rod 119 extends through an aperature in the upper end of the bracket 113 and is threaded into a threaded opening in the upper end of the bracket 114. The spring 117 is biased, in a similar manner, between the upper end of the bracket 114 and a washer 124. The spring 118 is biased between the outer end of the bracket 115 and an extension 125 on the outer end of a base support member 126 similar to the base support member 26. A pin 127 extending through one end of the support member 126 serves as a pivot for the brackets 113 and 115. The bracket 114 is pivoted on a pin 128 extending through the other end of the support member 126.

The springs 116, 117, and 118 permit instantaneous outward movement of the brackets 113, 114, and 115, respectively, in response to an increase in the rate at which the feed crop material enters the wrapping chamber so that no damage is done to the mechanism in the short interval of time that may elapse before the speed control means operates to increase the rotational speed of the wrapping rollers. The axial movement of the roll of feed crop material in the wrapping chamber is speeded up, in a manner hereinafter described, in response to any increase in the feeding, rate, and the rollers 91, 92, and 93 are returned to their initial positions immediately after the speed adjustment. As in the embodiment of FIGURES 1 to 3, the springs 116, 117, and 118 may be adjusted to provide any desired tension on the wrapping rollers.

Although two preferred embodiments of the invention have been described in considerable detail, it will be understood that the description thereof is intended to be illustrative, rather than restrictive, as many details of construction may be modified or changed without departing from the spirit or scope of the invention. Accordingly, it is not desired to be restricted to the exact structure described.

What is claimed is:

1. An apparatus for forming elongated rolls of feed crop material comprising a plurality of wrapping rollers arranged in skewed relationship to provide a wrapping chamber therebetween, means for feeding crop material into said wrapping chamber, means for rotating said rollers in a common direction to form an elongated roll of crop material in said wrapping chamber and to move it axially of said wrapping chamber, speed control means for varying the axial movement of said roll, and load sensing means operatively connected to said speed control means for varying the speed of the axial movement of said roll in response to variations in the quantity of crop material handled by the apparatus, whereby the density of said roll of crop material discharged from said wrapping chamber may be maintained substantially uniform regardless of the rate at which said crop material is fed into said wrapping chamber.

2. An apparatus as recited in claim 1, in which said means for feeding said roll axially of said wrapping chamber includes a spindle extending through said wrapping chamber, and means operatively connecting said speed control means to one end of said spindle.

3. An apparatus as recited in claim 1, said apparatus having a linkage for regulating said speed control means, and brackets for rotatably supporting opposite ends of said wrapping rollers, each of said brackets being movable in response to relative movement between said wrapping rolls caused by increases in the rate of feeding crop material into said wrapping chamber, and means operatively connecting two of said brackets to said linkage.

4. An apparatus as recited in claim 3 and having means urging return of said brackets to their initial position upon reduction in the rate of feeding crop material into said wrapping chamber.

5. An apparatus as recited in claim 1, said apparatus having a linkage for regulating said speed control means, and a pair of crushing rollers positioned to receive between them the crop material being fed to said wrapping chamber, said crushing rollers being rotatably mounted forwardly of said wrapping chamber, and means urging said crushing rollers toward each other, one of said crushing rollers being movable away from the other in response to increases in the rate of feeding crop material therebetween, and means operatively connecting said one crushing roller to said linkage, whereby said speed control means is regulated by relative movement between said crushing rollers.

6. An apparatus as recited in claim 5, in which said means operatively connecting said one crushing roller to said linkage comprises a shaft on which said one crushing roller is mounted, a torsion bar rotatably mounted in spaced relationship to said one crushing roller, said torsion bar being fixed to one end of said linkage, and an arm rigidly secured to said shaft and said torsion bar for oscillating said torsion bar in response to movement of said one crushing roller relative to said other crushing roller.

7. An apparatus as recited in claim 5 and having resilient mounting means for one end of each of said wrapping rollers to permit instantaneous relative movement between said wrapping rollers independently of said speed control means in response to variations in the rate of feeding crop material into said wrapping chamber.

8. An apparatus as recited in claim 1, in which each of said wrapping rollers is mounted on a shaft having a pair of couplings between said wrapping roller and the means for rotating it, whereby each of said wrapping rollers may be adjusted angularly with respect to said wrapping chamber.

9. An apparatus as recited in claim 1 in which said load sensing means comprises a plurality of individually pivoted brackets arranged in pairs at opposite ends of each of said rollers, bearings mounted in each of said brackets for rotatably supporting said rollers, and spring means urging each of said brackets back to its initial position upon reduction in the rate of feeding crop material to said apparatus.

10. An apparatus as recited in claim 1 and having two independent brackets for rotatably supporting two of said wrapping rollers, said brackets having upstanding parallel arms, spring means urging said arms toward each other, said load sensing means comprising a bell crank mounted on a fixed pivot, a link secured to one end of said bell crank, a sheave secured to the other end of said link, and a cable extending around said sheave with its ends connected to said arms, whereby outward movement of said arms initiates adjusting movement of said speed control means.

References Cited

UNITED STATES PATENTS

| | | | |
|---|---|---|---|
| 961,997 | 6/1910 | Ball et al. | 100—86 |
| 963,775 | 7/1910 | Killman | 100—43 |
| 963,823 | 7/1910 | Spoon | 100—43 XR |
| 1,331,016 | 2/1920 | Kruse | 100—45 |
| 2,916,792 | 12/1959 | Crook et al. | |
| 3,316,694 | 5/1967 | McColly et al. | 100—86 XR |

BILLY J. WILHITE, *Primary Examiner.*